April 7, 1936.  W. E. PAKALA  2,036,233
CONTROL SYSTEM FOR ARC WELDING
Filed Jan. 14, 1933
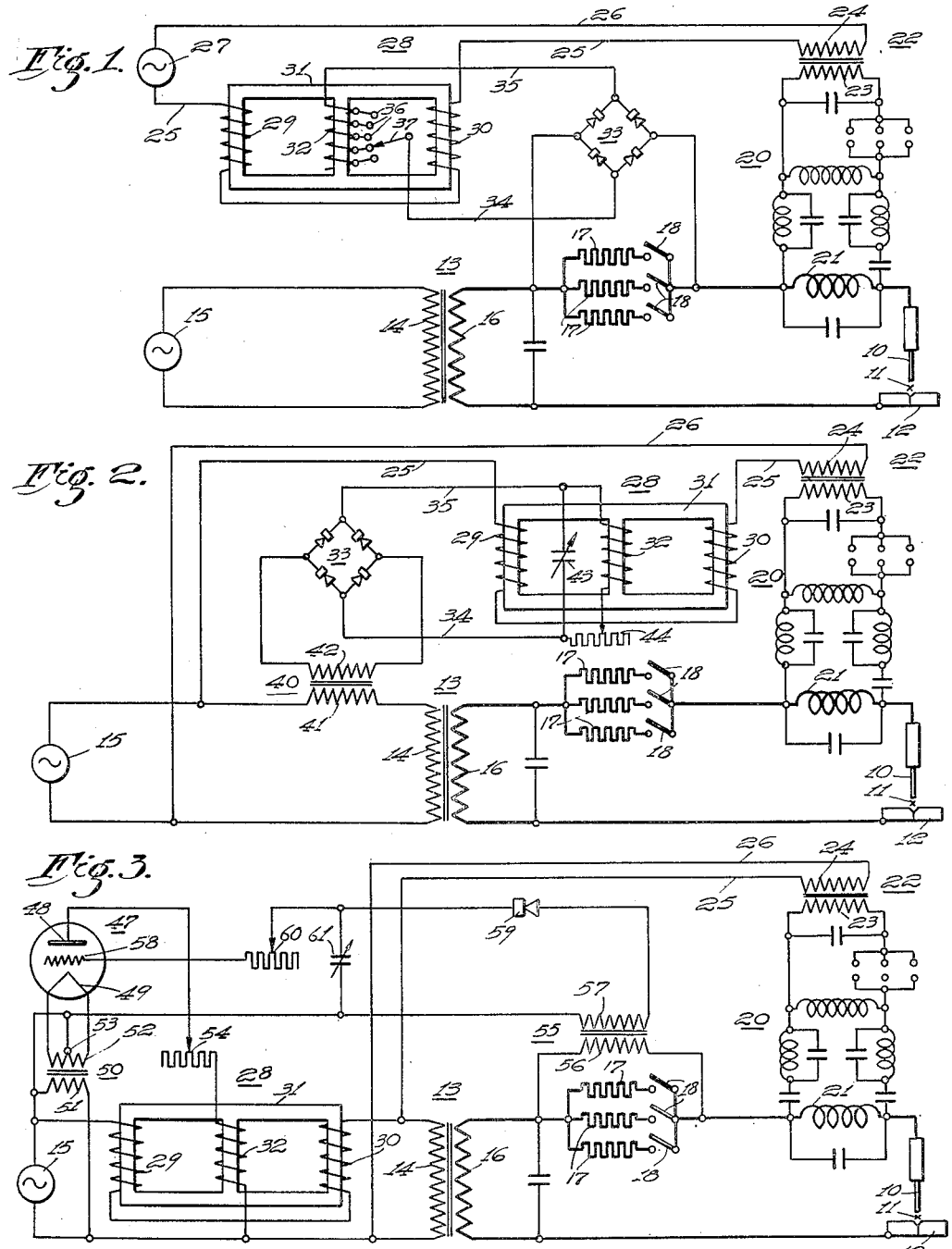
WITNESSES:  
E. C. Leiding  
R R Lockwood
INVENTOR  
William E. Pakala.  
BY  
ATTORNEY Patented Apr. 7, 1936

2,036,233

UNITED STATES PATENT OFFICE 2,036,233

CONTROL SYSTEM FOR ARC WELDING

William E. Pakala, Wilkinsburg, Pa., assignor to Westinghouse Electric & Manufacturing Company, East Pittsburgh, Pa., a corporation of Pennsylvania Application January 14, 1933, Serial No. 651,680

13 Claims. (Cl. 219—8)

My invention relates, generally, to arc welding and it has particular relation to control systems for arc welding.

When a high-frequency generator is used for stabilizing the operation of a welding arc, it is desirable to initiate its operation after the operator has caused the welding electrodes to engage in order to avoid the application of the high-frequency potential to the body of the operator. While it is well known that the application of a high potential to the body of a person at high frequency is comparatively harmless, still it is uncomfortable and it constitutes an objection to welding apparatus in which this type of generator is used. In some instances, when the operator is working in a dangerous position, such as a steel frame work some distance from the ground, the shock that may be received on touching the welding circuit may be such as to cause the operator to fall from his position.

It is also desirable to maintain the high-frequency generator in operation only while the welding operation is being performed and not during the intervals between welding operations in order to increase the life of the spark gaps which form a part of the high-frequency generator. It is not always possible for the operator to conveniently shut down the welding set between welding operations, and therefore, the high-frequency generator is usually maintained in operating condition for several hours during which the welding operation may be carried on intermittently, but during which time the spark gaps are continually wearing away, if some automatic means are not provided for shutting down the generator at the termination of a welding operation.

In certain instances, it is also desirable to regulate the flow of welding current in somewhat the same manner that current is supplied for initiating and terminating the functioning of the high-frequency generator. This is desirable in order to increase the efficiency of the system and to provide a convenient means for regulating the flow of welding current so that the welding operation may be carried on with different values of current.

While it is desirable to discontinue the operation of the high-frequency generator during periods when the welding operation is not being performed, it is also desirable to maintain it in operation for a predetermined regulatable length of time after the welding current ceases to flow. This function is desirable for the reason that the welding arc may be more readily struck again if it is desired to again initiate the welding operation during this period. The maintenance of the high-frequency generator in operation is desirable when the welding operation is being carried on under conditions in which the welding arc is likely to be extinguished and during which it is desirable to immediately reestablish it.

In view of the foregoing, the object of my invention generally stated, is the provision of control systems for arc welding which shall be simple and efficient in operation, and which may be readily and economically manufactured and installed.

The principal object of my invention is to provide for automatically initiating and terminating the functioning of a high-frequency generator which is used for stabilizing the operation of a welding arc.

An important object of my invention is to provide for maintaining a high-frequency generator in operation for a regulatable time interval after the welding arc is extinguished.

Another object of my invention is to provide for controlling the amount of current which may be permitted to flow for performing welding operations.

Still another object of my invention is to provide for simultaneously initiating the operation of a high-frequency generator for stabilizing the operation of a welding arc and setting up a circuit to permit a predetermined amount of current to flow for performing the welding operation.

Other objects of my invention will, in part, be obvious and in part appear hereinafter.

My invention, accordingly, is disclosed in the embodiment hereof shown in the accompanying drawing and comprising the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawing, in which:

Figure 1 illustrates diagrammatically a welding system organized in accordance with my invention; and, Figs. 2 and 3 illustrate diagrammatically certain modifications of the system shown in Fig. 1.

In order to regulate the amount of current which is supplied to the high-frequency generator that is used for stabilizing the operation of the welding arc, a saturable reactor is connected in series circuit relation with the primary winding of the transformer that is used for supplying the necessary voltage for effecting the operation of the high-frequency generator. A direct current winding is provided on the reactor and is arranged to be energized from a direct current source on flow of welding current so that the impedance of the saturable reactor may be reduced to permit sufficient current to flow to the transformer to initiate the operation of the high-frequency generator. When the welding current ceases to flow, the direct current potential applied to the direct current winding is removed and sufficient impedance is thereupon inserted in the circuit including the primary winding of the transformer to prevent the further operation of the high-frequency generator.

In order to maintain the high frequency generator in operation for a predetermined time after the welding current ceases to flow, various means are provided for maintaining the application of the direct current potential to the direct current winding of the saturable reactor during the desired interval. This regulation is obtained by providing taps on the the direct current winding in one modification of the invention so that the inductance of the direct current winding may be varied, thereby varying the time during which the reactor will be maintained in the saturated condition. In modifications of the invention the direct current potential is maintained across the direct current winding by means of a capacitor which is connected in shunt circuit relation therewith or by means of a space-discharge device which is maintained conducting for a predetermined interval after the welding current ceases to flow by maintaining the grid thereof energized by means of a suitable resistor and capacitor circuit.

Referring now particularly to Fig. 1 of the drawing, the reference character 10 designates a welding electrode which is arranged to strike an arc 11 between it and work 12. Throughout the specification the electrode 10 and work 12 will be referred to as welding electrodes between which an arc may be struck, in order to simplify the description of the invention.

In order to supply current to the welding electrodes 10 and 12 a transformer 13 is provided having a primary winding 14 connected to a suitable source of alternating current 15 and a secondary winding 16. The secondary winding 16 is connected to the welding electrodes 10 and 12 through resistors 17 which may be connected by means of switches 18 to adjust the welding current to the value desired, depending upon the welding operation which is to be performed.

In order to stabilize the operation of the welding arc 11 a high-frequency generator, illustrated generally at 20, is provided. The high-frequency generator 20 may be of the spark gap type in which high-frequency oscillations are produced, as is well known to those skilled in the art. The high-frequency generator 20 may be connected to the welding circuit across an inductor 21, as illustrated. In order to provide the proper voltage for operating the high-frequency generator 20 a transformer 22 is provided having a secondary winding 23 connected to the high-frequency generator 20. The primary winding 24 of the transformer 22 may be connected by means of conductors 25 and 26 to a source 27 of alternating current.

In order to regulate the flow of current to the primary winding 24 of the transformer 22, as saturable reactor or variable impedance device 28, is provided, having windings 29 and 30 connected in series circuit relation and in series circuit relation with conductor 25, the source of alternating current 27 and primary winding 24 of the transformer 22. The windings 29 and 30 are disposed on the outside legs of the core 31 of the reactor 28 and a tertiary or direct current winding 32 is provided on the central or third leg. As is well known, by the application of direct current to the tertiary winding 32 the core 31 may be readily saturated to reduce the effective impedance of the reactor 28 and thereby permit current to flow from the alternating current source 27 to the primary winding 24 of the transformer 22 and initiate the operation of the high-frequency generator 20.

In order to supply direct current for energizing the tertiary winding 32 a suitable rectifier 33, such, for example, as a copper-oxide rectifier may be utilized. The direct-current terminals of the rectifier 33 may be connected by means of conductors 34 and 35 to the terminals of the tertiary winding 32. The alternating current terminals of the rectifier 33 are connected in shunt circuit relation with the resistors 17 so that, on flow of welding current through any one of the resistors 17, the rectifier 33 will be energized to apply direct current to the tertiary winding 32, as will be readily understood.

As set forth hereinbefore, it is desirable to maintain the high-frequency generator 20 in operation for a predetermined time after welding current ceases to flow through the resistors 17. In order to provide for regulating the time during which the high-frequency generator 20 is maintained in operation after the welding current ceases to flow, the tertiary winding 32 is provided with a series of taps 36 to any one of which a rotatable switch 37 may be connected, as desired. By means of the switch 37 it is possible to connect as many turns of the tertiary winding 32 in the circuit as necessary in order to obtain the desired time delay.

As will be readily understood, the greater the number of turns of the tertiary winding 32 that are energized the greater will be the inductance of this winding and, in turn, the longer time it will require to completely deenergize it on cessation of flow of welding current to restore the reactor 28 to the non-saturated condition.

In operation, the operator brings the welding electrodes 10 and 12 into contact engagement, thereby causing current to flow from the alternating current source 15 through the transformer 13 and resistors 17 to perform the welding operation. At the same time alternating current potential is applied to the rectifier 33 which, in turn, causes a direct current potential to be applied to the tertiary winding 32 to saturate the core 31 of the reactor 28. Current is then permitted to flow from the alternating current source 27 to the primary winding 24 of the transformer 22 and a sufficient potential is applied to the secondary winding 23 to initiate the functioning of the high-frequency generator 20.

As long as the welding operation is continued the high-frequency generator 20 will be maintained in operation. As soon as the welding current ceases to flow, the alternating current potential is removed from the rectifier 33 and the high frequency generator 20 will cease to function after a predetermined time interval the length of which is determined by the setting or adjustment of the switch 37, as set forth in detail hereinbefore.

Because of the inherent time lag of the tertiary winding 32, the same time will be required to initiate the functioning of the high-frequency generator 20 after the welding current is again caused to flow in the welding circuit.

While this invention has been illustrated and described as employing a high-frequency generator of the spark gap type, it will be readily apparent that this invention may also be practiced if a high-frequency generator of the vacuum tube type is provided. It will be readily apparent to those skilled in the art how the circuits may be modified to use this type of generator in the event that it is found desirable to do so. It will also be apparent that this invention may be used in a direct current welding system.

Referring now particularly to Fig. 2 of the drawing, it will be observed that the alternating current generator 27 has been omitted and that the primary winding 24 of the transformer 22 is connected directly across the terminals of the alternating current generator 15 through conductors 25 and 26. The windings 29 and 30 of the saturable reactor 28 are again connected in series circuit relation with the transformer primary winding 24 and an alternating current source, which, in this instance, is the main generator 15.

In this modification of the invention the operation of the high-frequency generator 20 is initiated in response to the flow of welding current by means of a transformer 40 having a primary winding 41 connected in series circuit relation with the primary winding 14 of transformer 13, as illustrated, and a secondary winding 42 connected to the alternating current terminals of the rectifier 33. In order to cause the tertiary winding 32 to remain energized for a predetermined time after welding current ceases to flow, a variable capacitor 43 is connected in shunt circuit relation to the tertiary winding 32 through a variable resistor 44.

It will be readily understood that the application of direct current potential to the capacitor 43 causes it to assume a charge during the time that the tertiary winding 32 is maintained energized by the continued application of direct current from the rectifier 33. As soon as the welding current ceases to flow, the rectifier 33 is de-energized and does not supply direct current for energizing the tertiary winding 32. However, because of the charged condition of the capacitor 43, direct current continues to flow through the tertiary winding 32 through the resistor 44 for a predetermined time depending upon the amount of effective capacitance in the capacitor 43 and the amount of effective resistance in the resistor 44.

Thus, if the capacitor 43 is adjusted to make effective its entire capacitance, and the resistor 44 is adjusted to make available all of its resistance, direct current will flow through the tertiary winding 32 for the maximum time interval and during this interval the high frequency generator 20 will be maintained in operating condition. It will be evident that, by adjusting the variable capacitor 43 and the variable resistor 44, the high-frequency generator 20 may be maintained in operation for any desired interval of time after welding current ceases to flow.

Referring now particularly to Fig. 3 of the drawing, it will be observed that the saturable reactor 28 is connected to control not only the operation of the high-frequency generator 20 but that it is also arranged to control the flow of welding current from the alternating current source 15 to the electrodes 10 and 12. The windings 29 and 30 of the saturable reactor 28 are connected in series circuit relation with the alternating current source 15 and the primary winding 14 of the transformer 13.

In order to supply direct current to the tertiary winding 32 for saturating the core 31, a space discharge device 47 of the hot cathode type is provided. The space discharge device 47 is provided with the usual anode 48 and cathode 49. The cathode 49 may be heated by means of a suitable transformer 50 having a primary winding 51 connected to the alternating current source 15 and a secondary winding 52 connected to the cathode 49. The mid-point 53 of the secondary winding 52 is connected to one terminal of the alternating current source 15 while the anode 48 is connected through a variable resistor 54 to the tertiary winding 32, the other terminal of which is connected to the alternating current source 15, as shown.

In order to render the space discharge device 47 conducting on flow of welding current, a transformer 55 is provided having a primary winding 56 connected across the resistors 17 and a secondary winding 57 connected across grid 58 and the mid-point 53 of the transformer 52 through a rectifier 59.

With a view to maintaining the grid 58 energized for a regulatable time interval after welding current ceases to flow, an adjustable resistor 60 is provided in series circuit relation therewith, as illustrated, and a variable capacitor 61 is connected to the variable resistor 60 and the mid-point 53 of the transformer 52.

In operation, the operator brings electrodes 10 and 12 into engagement, thereby causing a small amount of current to flow through the resistors 17. This current is initially small because of the relatively large impedance afforded by the saturable reactor 28 in series circuit relation with the primary winding 14. However, sufficient current is permitted to flow to apply a suitable energizing potential to the grid 58 to render the space discharge device 47 conducting, as will be readily understood. Direct current is then permitted to flow through the tertiary winding 32 to saturate the core 31. Because of the saturation of the core 31, the impedance of the saturable reactor 28 is reduced to a negligible value and welding current is permitted to flow.

It will be observed that the primary winding 24 of the transformer 22 is connected in parallel circuit relation with the primary winding 14 of the transformer 13. It will then be understood that the operation of the high-frequency generator 20 is initiated at the same time that welding current is permitted to flow to perform the welding operation.

The amount of welding current that is permitted to flow may be adjusted by means of the variable resistor 54 which, as will be readily understood, may be used to vary the degree of saturation of the reactor 28 and thereby the amount of effective impedance which is inserted in series circuit relation with the primary winding 14. In certain instances, it may be desirable to obtain the entire control of the welding current by means of the variable resistor 54 and to omit the resistors 17 entirely.

In the event that the resistors 17 are omitted the primary winding 56 of the transformer 55 may be arranged to carry the entire welding current or the primary winding 56 may be connected in shunt circuit relation across the windings 29 and 30 of the saturable reactor 28, as may be desired. It will also be apparent that various other circuits may be used to effect the energization of the grid 58 on flow of welding current.

When the welding operation has been completed, current ceases to flow through the resistors 17 and the energizing potential is no longer applied to the grid 58 through the transformer 55. However, while the grid 58 is being energized from the transformer 55 during the performance of the welding operation, the variable capacitor 61 assumes a charge, the value of which depends upon the amount of capacitance therein. When the welding current ceases to flow, the capacitor 61 continues to apply an energizing potential to the grid 58 to maintain the grid 58 charged to ionizing potential for a time interval depending upon the setting of the variable capacitor 61 and the variable resistor 60, as will be readily understood.

Because of the inherent operating characteristics of the space discharge device 47, it becomes conducting the instant that the flow of welding current is initiated rather than introducing a time lag in the initiation of the operation of the high-frequency generator 20.

Since further changes may be made in the above control system, and different embodiments of the invention may be made without departing from the scope thereof, it is intended that all matter contained in the above description or shown in the accompanying drawing shall be interpreted as illustrative and not in a limiting sense.

I claim as my invention:

1. In arc welding apparatus, in combination, welding electrodes adapted to strike an arc, a circuit connected to the electrodes for supplying current for performing a welding operation, a high-frequency generator connected to the welding circuit for supplying high-frequency current to stabilize the operation of the welding arc, circuit means connecting the high-frequency generator to a source of alternating current, a variable impedance device interposed between the source of alternating current and the high-frequency generator for regulating the flow of current through the circuit means, and circuit means connecting the variable impedance device to the welding circuit to effect a decrease in the impedance of the first-named circuit means on flow of welding current, thereby permitting a relatively large current to flow to initiate the operation of the high-frequency generator.

2. In arc welding apparatus, in combination, welding electrodes adapted to strike an arc, a circuit connected to the electrodes for supplying current for performing a welding operation, a resistor connected in series circuit relation with said circuit, a high-frequency generator connected to the welding circuit for supplying high-frequency current to stabilize the operation of the welding arc, circuit means connecting the high-frequency generator to a source of alternating current, a variable impedance device interposed between the source of alternating current and the high-frequency generator in the circuit means for regulating the flow of current therethrough, a tertiary winding on the variable impedance device, and circuit means connecting the tertiary winding in shunt circuit relation with said resistor to effect a decrease in the impedance of the first-named circuit means on flow of welding current through the resistor, thereby permitting a relatively large current to flow to initiate the operation of the high-frequency generator.

3. In arc welding apparatus, in combination, welding electrodes adapted to strike an arc, a circuit connected to the electrodes for supplying alternating current for performing a welding operation, a resistor connected in series circuit relation with said circuit, a high-frequency generator connected to the welding circuit for supplying high-frequency current to stabilize the operation of the welding arc, circuit means connecting the high-frequency generator to a source of alternating current, a variable impedance device interposed between the source of alternating current and the high-frequency generator in the circuit means for regulating the flow of current therethrough, a direct current winding on the variable impedance device, rectifying means connected to the direct current winding, circuit means connecting the rectifying means in shunt circuit relation with said resistor to permit the energization of the direct current winding, thereby decreasing the impedance of the first-named circuit means to permit a relatively large current to flow to initiate the operation of the high-frequency generator, and means for varying the number of effective turns on the direct current winding to vary the time the high-frequency generator is maintained energized after welding current ceases to flow.

4. In arc welding apparatus, in combination, welding electrodes adapted to strike an arc, a welding circuit connected to the electrodes for supplying alternating current for performing a welding operation, a high-frequency generator connected to the welding circuit for supplying high-frequency current to stabilize the operation of the welding arc, circuit means connecting the high-frequency generator to a source of alternating current, a variable impedance device interposed between the source of alternating current and the high-frequency generator in the circuit means for regulating the flow of current therethrough, a tertiary winding on the variable impedance device, rectifying means connected to the tertiary winding, and a transformer having a primary winding connected in series circuit relation with the welding circuit and a secondary winding connected to the rectifying means to effect the energization of the tertiary winding on flow of welding current and thereby decrease the impedance in the circuit means to permit a relatively large current to flow to initiate the operation of the high-frequency generator.

5. In arc welding apparatus, in combination, welding electrodes adapted to strike an arc, a welding circuit connected to the electrodes for supplying alternating current for performing a welding operation, a high-frequency generator connected to the welding circuit for supplying high-frequency current to stabilize the operation of the welding arc, circuit means connecting the high-frequency generator to a source of alternating current, a variable impedance device interposed between the source of alternating current and the high-frequency generator in the circuit means for regulating the flow of current therethrough, a tertiary winding on the variable impedance device, rectifying means connected to the tertiary winding, a transformer having a primary winding connected in series circuit relation with the welding circuit and a secondary winding connected to the rectifying means to effect the energization of the tertiary winding on flow of welding current and thereby decrease the impedance in the circuit means to permit a relatively large current to flow to initiate the operation of the high-frequency generator, and means for maintaining the tertiary winding energized for a predetermined time after welding current ceases to flow to maintain the high-frequency generator in operating condition.

6. In arc welding apparatus, in combination, welding electrodes adapted to strike an arc, a welding circuit connected to the electrodes for supplying alternating current for performing a welding operation, a high-frequency generator connected to the welding circuit for supplying high-frequency current to stabilize the operation of the welding arc, circuit means connecting the high-frequency generator to a source of alternating current, a variable impedance device interposed between the source of alternating current and the high-frequency generator for regulating the flow of current therethrough, a tertiary winding on the variable impedance device, rectifying means connected to the tertiary winding, a transformer having a primary winding connected in series circuit relation with the welding circuit and a secondary winding connected to the rectifying means to effect the energization of the tertiary winding on flow of welding current and thereby decrease the impedance in the circuit means to permit a relatively large current to flow to initiate the operation of the high-frequency generator, and means for maintaining the tertiary winding energized for a regulatable time interval after welding current ceases to flow to maintain the high-frequency generator in operating condition.

7. In arc welding apparatus, in combination, welding electrodes adapted to strike an arc, a welding circuit connected to the electrodes for supplying alternating current for performing a welding operation, a high-frequency generator connected to the welding circuit for supplying high-frequency current to stabilize the operation of the welding arc, circuit means connecting the high-frequency generator to a source of alternating current, a variable impedance device interposed between the source of alternating current and the high-frequency generator for regulating the flow of current therethrough, a tertiary winding on the variable impedance device, rectifying means connected to the tertiary winding, a transformer having a primary winding connected in series circuit relation with the welding circuit and a secondary winding connected to the rectifying means to effect the energization of the tertiary winding on flow of welding current and thereby decrease the impedance in the circuit means to permit a relatively large current to flow to initiate the operation of the high-frequency generator, and an adjustable resistor connected in series circuit relation with the tertiary winding and an adjustable capacitor connected in shunt circuit relation with the tertiary winding and the adjustable resistor for maintaining the tertiary winding energized for a regulatable time interval after welding current ceases to flow to maintain the high-frequency generator in operation.

8. In arc welding apparatus, in combination, welding electrodes adapted to strike an arc, a welding circuit including a transformer having a primary winding connected to a current source and a secondary winding connected to the electrodes for supplying alternating current for performing a welding operation, a saturable reactor interposed between the primary winding and the current source for regulating the flow of welding current, and control means operable on flow of current in the welding circuit for effecting an increase in the degree of saturation of the reactor to permit a predetermined welding current to flow.

9. In arc welding apparatus, in combination, welding electrodes adapted to strike an arc, a welding circuit connected to the electrodes for supplying alternating current for performing a welding operation, a saturable reactor interposed in the welding circuit for regulating the flow of welding current, means operable on flow of current in the welding circuit for effecting an increase in the degree of saturation of the reactor to permit a predetermined welding current to flow, and means for maintaining the reactor in the saturated condition for a predetermined time interval after the welding current ceases to flow.

10. In arc welding apparatus, in combination, welding electrodes adapted to strike an arc, a circuit connected to the electrodes for supplying current from an alternating current source for performing a welding operation, a resistor connected in series circuit relation with said circuit, a saturable reactor interposed in the welding circuit for regulating the flow of welding current, a direct current winding on the reactor, a space-discharge device connected in series circuit relation with the direct current winding, circuit means connecting the direct current winding and the space-discharge device to the source of alternating current, a grid in the space-discharge device, rectifying means connected in series circuit relation with the grid, a transformer having a primary winding connected in shunt circuit relation to the resistor and a secondary winding connected to the rectifying means to apply an energizing potential to the grid thereby rendering the space-discharge device conducting on flow of current through the resistor to permit current to flow in the direct current winding and a predetermined welding current to flow, and a variable resistor connected in series circuit relation to the grid, and a variable capacitor connected between the variable resistor and the cathode of the space-discharge device to maintain the grid energized for a regulatable time interval after welding current ceases to flow.

11. In arc welding apparatus, in combination, welding electrodes adapted to strike an arc, a welding circuit connected to the electrodes for supplying alternating current for performing a welding operation, a high-frequency generator connected to the welding circuit for supplying high-frequency current to stabilize the operation of the welding arc, said generator being connected for energization across the welding circuit, a saturable reactor interposed in the welding circuit for regulating the flow of current to the welding arc and to said generator, and means operable on flow of current in the welding circuit for effecting an increase in the degree of saturation of the reactor to permit a predetermined welding current to flow and to initiate the functioning of the high-frequency generator.

12. In arc welding apparatus, in combination, welding electrodes adapted to strike an arc, a welding circuit connected to the electrodes for supplying alternating current for performing a welding operation, a high-frequency generator connected to the welding circuit for supplying high-frequency current to stabilize the operation of the welding arc, said generator being connected for energization across the welding circuit, a saturable reactor interposed in the welding circuit for regulating the flow of current to the welding arc and to said generator, means operable on flow of current in the welding circuit for effecting an increase in the degree of saturation of the reactor to permit a predetermined welding current to flow and to initiate the functioning of the high-frequency generator, and means for maintaining the reactor in the saturated condition for a predetermined time interval after the welding current ceases to flow for maintaining the high-frequency generator in operation.

13. In arc welding apparatus, in combination, welding electrodes adapted to strike an arc, a welding circuit connected to the electrodes for supplying current from an alternating current source for performing a welding operation, a high-frequency generator connected to the welding circuit for supplying high-frequency current to stabilize the operation of the welding arc, said generator being connected for energization across the welding circuit, a resistor connected in series circuit relation with the welding circuit, a saturable reactor interposed in the welding circuit for regulating the flow of current to the welding arc and to said generator, a direct current winding on the reactor, a space-discharge device connected in series circuit relation with the direct current winding, circuit means connecting the direct current winding and the space discharge device to the source of alternating current, a grid in the space-discharge device, rectifying means connected in series circuit relation with the grid, a transformer having a primary winding connected in shunt circuit relation to the resistor and a secondary winding connected to the rectifying means to apply an energizing potential to the grid to render the space-discharge device conducting on flow of current through the resistor and to permit current to flow in the direct current winding thereby initiating the functioning of the generator and permitting a predetermined welding current to flow, and a variable resistor connected in series circuit relation to the grid and a variable capacitor connected between the variable resistor and the cathode of the space-discharge device to maintain the grid energized for a regulatable time interval after welding current ceases to flow.

WILLIAM E. PAKALA.